Aug. 31, 1965  N. R. COOPER ET AL  3,203,368
CRUST FORMING MACHINE AND SYSTEM
Filed March 26, 1962  6 Sheets-Sheet 1

FIG.1

INVENTORS:
NOEL R. COOPER
JAMES D. FLANIGAN
JOHN W. JONES
JAMES O. MAVIS
MARCUS I. WEGNER
BY
Gravely, Lieder & Woodruff
ATTORNEYS, Aug. 31, 1965   N. R. COOPER ET AL   3,203,368
CRUST FORMING MACHINE AND SYSTEM
Filed March 26, 1962   6 Sheets-Sheet 3

FIG.3

INVENTORS:
NOEL R. COOPER
JAMES D. FLANIGAN
JOHN W. JONES
JAMES O. MAVIS
MARCUS I. WEGNER
BY
Gravely, Lieder & Woodruff
ATTORNEYS.

Aug. 31, 1965  N. R. COOPER ET AL  3,203,368
CRUST FORMING MACHINE AND SYSTEM
Filed March 26, 1962  6 Sheets-Sheet 5

INVENTORS:
NOEL R. COOPER
JAMES D. FLANIGAN
JOHN W. JONES
JAMES O. MAVIS
MARCUS I WEGNER
BY
Gravely, Lieder & Woodruff
ATTORNEYS.

FIG. 8

3,203,368
CRUST FORMING MACHINE AND SYSTEM
Noel R. Cooper and James D. Flanigan, Greenville, Ill., John W. Jones, St. Louis County, Mo., James O. Mavis, Greenville, Ill., and Marcus I. Wegner, Tenafly, N.J., assignors to Pet Milk Company, St. Louis, Mo., a corporation of Delaware
Filed Mar. 26, 1962, Ser. No. 182,418
12 Claims. (Cl. 107—15)

The present invention relates to an apparatus for mechanically forming pie crust shells and particularly relates to a machine and system for continuously producing crumb pie crusts.

One of the principal objects of the present invention is to provide an apparatus for making crumb pie crusts in an economical and practical manner on a continuous production line.

Another object of the present invention is to provide a method for forming a graham cracker crust in a pie pan, said crust being of uniform thickness on the side and bottom and not requiring baking before being filled with cream, cheese or fruit filling.

Still another object of the present invention is to provide a method and apparatus for mechanically forming graham cracker crusts without the necessity of baking the finished crust and without using human hands in the process.

These and other objects and advantages will become apparent hereinafter.

The present invention comprises a system and apparatus for producing crumb pie crust including a plurality of crust forming stations, each of said stations having a crust forming apparatus, and means for loading pie shells with a predetermined quantity of crumbs, and means for removing the finished crusts and shells from the crust forming machines and transferring the finished shells to a cooling tunnel. The present invention further comprises the process hereinafter described and claimed and the crust forming machine specifically disclosed and claimed herein.

In the accompanying drawings wherein like numerals refer to like parts wherever they occur.

Figure 1:
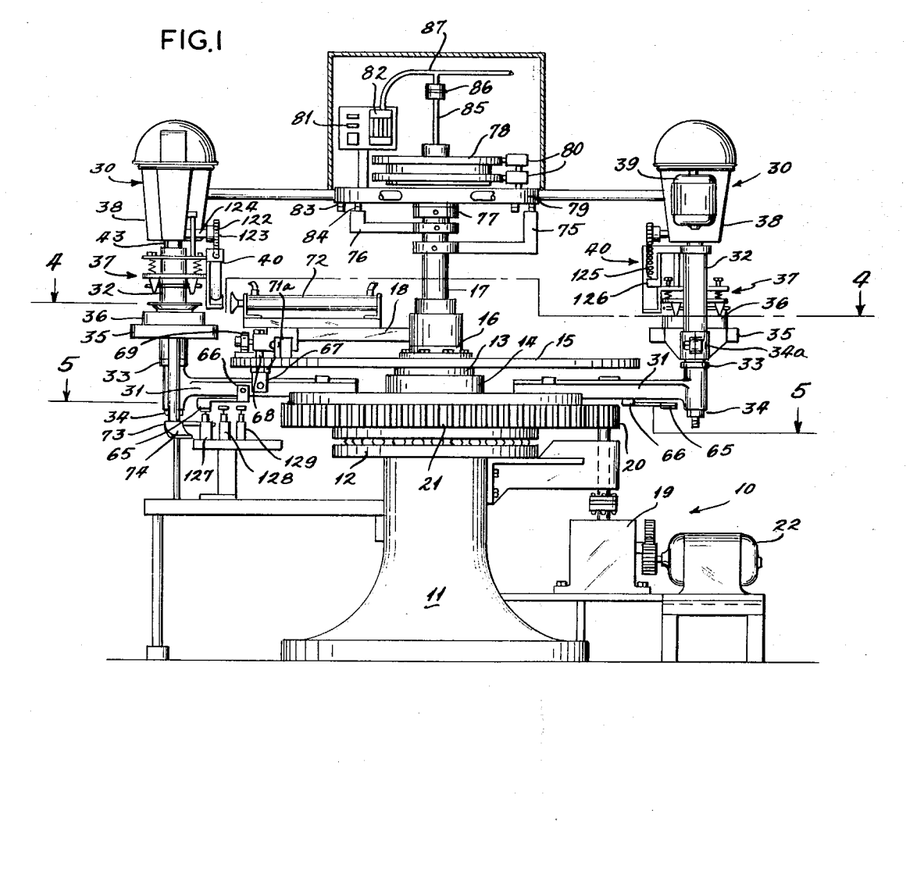
FIG. 1 is a side elevation of the present crust forming system with four of the six crust forming devices removed for simplicity and clarity of explanation.

Referring to FIG. 1, a crust forming apparatus 10 comprises a machine base 11 which supports a bearing plate 12 and a centering guide ring 13. A turntable 14 revolves about the centering guide ring 13. The guide ring 13 also furnishes support for a stationary table 15, a center post 16 and an accessory column 17. A discharge arm 18 revolves about the center post 16. A conventional right angle gear box 19 transmits the power of rotation from a power source 22 to a pinion gear 20 which in turn meshes and drives a bull ring gear 21 affixed to the turntable 14, causing the turntable 14 to rotate about its axis.

The revolving turntable 14 supports and carries six crust forming devices 30 (only two of which are shown in FIG. 1 for clarity), in a continuous circular path. The crust forming devices are attached to the turntable 14 by carrier arms 31. One end of each carrier arm 31 is attached to the turntable 14 and the other end rigidly supports a column 32. The column 32 is welded to a mounting post flange 33 and is held in position on the carrier arm 31 by a mounting post nut 34.

Figure 6:
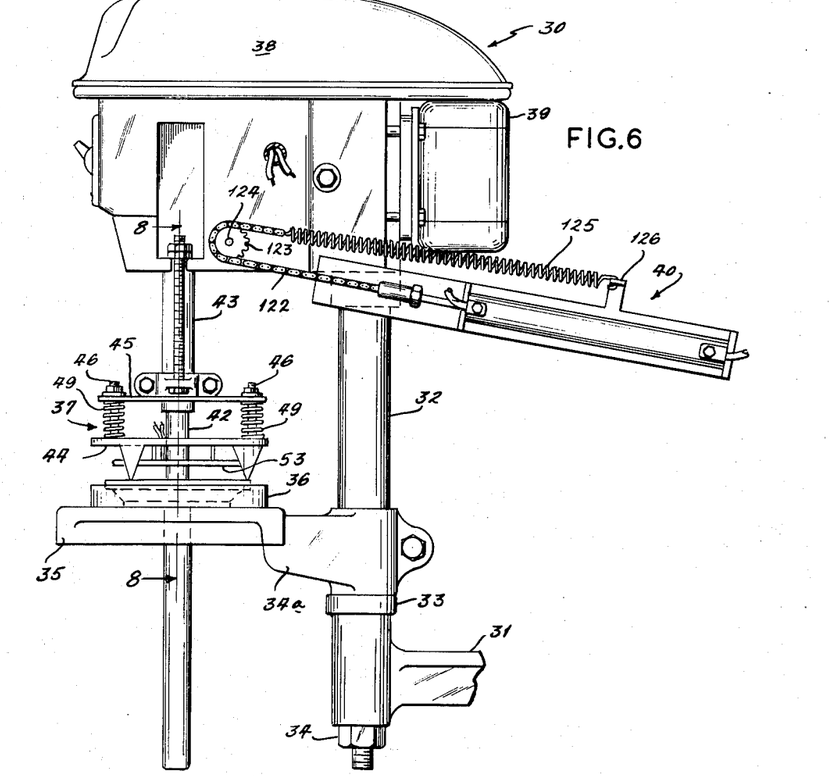
FIG. 6 is a broken elevational view taken along line 6—6 of FIG. 2 showing the crust forming head partly in detail and partly in side elevation.
Figure 8:
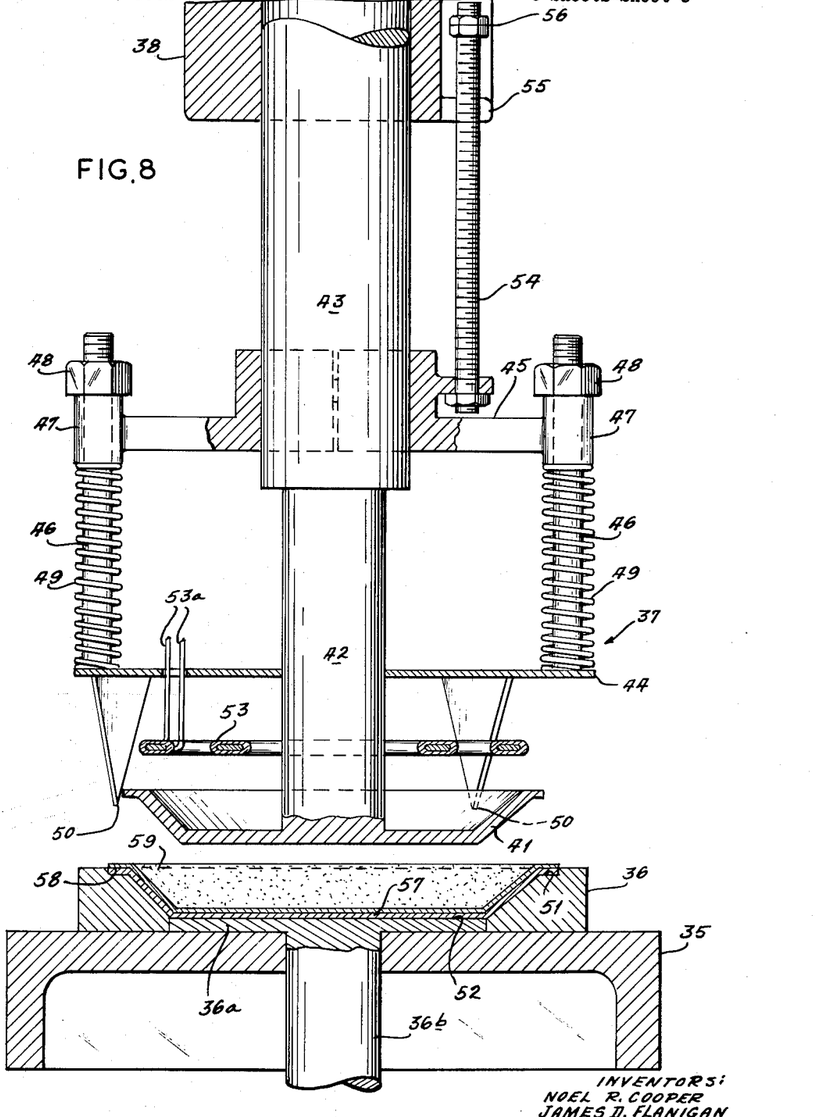
FIG. 8 is an enlarged fragmentary partially broken sectional view taken along line 8—8 of FIG. 6.

The crust forming apparatus 30 is mounted on the column 32 by an arm 34a and includes a plate holder table 35, a bottom mold 36, a spinning die mechanism 37, a retractor head 38, a retractor motor 39 and a spinning die actuator cylinder mechanism 40 (FIGS. 6 and 8).

The individual crust forming devices 30 are all alike and only one will be described in detail. FIGS. 6 and 8 show an enlarged view of the crust forming mechanism. As hereinbefore discussed, the crust former 30 includes the plate holder table 35, the bottom mold 36 and the spinning die mechanism 37. The mechanism 37 includes top die 41 fixed on a spindle or stem 42 which is rotatably mounted in one end of a retractable quill or post 43 whose other end is positioned within the retractor head 38. The rotating and raising and lowering mechanisms within the head 38 are similar to those within a conventional drill press head.

An annular plate 44 is slidably positioned around the spindle 42 above the top die 41 and is movably fastened to a mounting plate 45 which is fixed to the post 43 and moves up and down therewith. Studs 46 are fastened to the top of the plate 44 and pass through eyes 47 in the mounting plate 45 and are secured thereto by fastening nuts 48. Resilient means 49, such as the shown springs are positioned between the top of the casting 44 and the plate 45 and surround the studs 46. Spaced holding points 50 are positioned around the cover plate 44 and are aligned with a flat lip 51 of a pie pan receiving cavity 52 formed in the bottom mold 36.

A heating element 53 having leads 53a is fixed to the plate 44 and is located in close proximity to the top mold 41 and heats said mold 41 by radiation. The heating element 53 does not rotate with the top mold 41, but moves upwardly and downwardly with the spindle 42, the post 43, and the plate 44.

The bottom mold 36 includes a vertically movable bottom member 36a fastened to a lift rod 36b and adapted to move upwardly through the mold 36 when the bottom end of the lift rod is moved upwardly. When the bottom member 36a is moved upwardly, it will carry whatever may be positioned within the mold 36 with it.

The operation of the individual crust forming devices 30 will now be described, although the operation of each is synchronized and controlled by a series of switches and compressed air cylinders as will be more fully described hereinafter.

The heating element 53 is activated and the top mold 41 is preheated to a predetermined crust forming temperature for proper forming and fusing of the crust ingredients. A stop gauge, comprising a threaded stud 54 fastened to the mounting plate 45 and passing through an eye 55 on the retractor head 38 and a stop lock nut 56 threaded on the free end of the stud 54, is adjusted to the proper setting for the thickness of crust desired and to provide proper clearance between the top mold 41 and a pie pan 57 positioned in the lower mold cavity 52.

A predetermined quantity of crumb crust mixture, such as graham cracker crumb crust mixture, is placed in the bottom of the pie tin 57 and the pie tin 57, which may be of aluminum foil or other suitable material, is positioned within the bottom mold die 52. A flange 58 of the pie pan 57 is positioned on the die lip 51.

When the retractor motor 39 is started, the stem 42 is rotated within the post 43 and the top mold 41 also is rotated at a predetermined speed. When the actuator 40 is started, the post 43 and the rotating top mold are moved downwardly toward the lower mold 36. The holding points 50 on the plate 44 engage the pie pan flange 58 in the lower mold lip 51 and hold the pie tin 57 securely in place in the lower mold 36. The springs 49 are compressed and this increases the force of the points 50 on the pie pan flange 58 keeping the pie tin 57 firmly seated in the bottom mold 36. The spring loaded retaining points 50 prevent the pie tin 57 from revolving in the bottom mold cavity 52 and at the same time center the rotating upper mold 41 in the pie tin 57 for proper distribution of the crust ingredients. The revolving top die 41 continues to move downwardly toward and within the pie tin 57 and to compress the springs 49 until the lock nut 56 engages the top of the eye 55. The rotating top die 41 is then set within the pie pan 57 at a predetermined distance from the bottom and side walls thereof. The top die 41 is held at its lowest point of travel for a predetermined period of time to spin the crust crumbs outwardly and to form the pie shell uniformly over the inner surface of the pie tin 57. At the completion of the forming time, the revolving die 41 is raised. The lift rod 36b then is moved upwardly to raise the bottom mold member 36a which carries with it the completed crust 59 and pie tin 57. After the completed crust 59 is removed from the bottom mold cavity 52, it is cooled to allow the butter or vegetable fat to fuse the crust ingredients together, and stored.

The speed of the revolving upper die 41 influences the appearance of the finished crust and the formation thereof. If the mold 41 is revolved too slowly, the graham cracker crumb mixture does not distribute evenly along the bottom and sides of the pie tin 57. If the mold 41 is revolved too fast, it has a tendency to create fractures in the finished pie crust 59. The most desirable speed of the rotating upper die 41 is between 1,000 and 1,200 r.p.m. If the stop assembly is not properly adjusted, the quality of the pie crust suffers. If the stop lock nut 56 engages the eye 55 and spaces the top die 41 too far from the pie tin 57, a loose and crumbly crust results. If the stop is so adjusted that the top die 41 drops too close to the pie tin 57, it may damage the pie tin 57 or cause a discoloration thereof.

If the temperature of the upper mold 41 is below 170° F. the butter or vegetable fats in the crumb crust mixture do not become hot enough to fuse the crust ingredients together. If the temperature of the upper die 41 is too hot, approximately 200° F. and over, the crust mixture will become gummy and stick to the mold making a most undesirable crust. Thus, the temperature of the upper mold should be between 170° and 200° F.

The bottom mold 36 should be lined up with the upper mold 41 to form a crust of the proper distribution throughout the inner surface of the pie pan 57.

The optimum forming time during which the rotating upper die 41 is held at its lowermost position within the pie pan 57 is about five seconds. If the time is less than that, the ingredients do not become hot enough to fuse together. Longer times can be used, but do not contribute to a firmer or more desirable pie crust.

The die forming head 37 is relatively open at the bottom edge and only the points 50 engage the lower mold 36. If the top is closed, crumbs tend to accumulate and act as insulation which interferes in the passage of heat from the heating element 53 to the crust 59.

Turning back to the automatic crust forming apparatus of FIGS. 1-5, each of the carrier arms 31 has bolted to it a downwardly depending switch actuator 66 and a laterally and downwardly directed switch actuator 65.

A discharge arm trip plate 67 extends upwardly from the carrier arm 31 and engages a trip mechanism 68 which in turn motivates the discharge arm 18, when the arm 31 reaches the discharge portion "B" of its cycle. The outer extreme end of the discharge arm 18 is supported on two casters 69 which ride on the stationary table 15. The discharge arm 18 moves through a prescribed arc of the machine when the trip plate 67 engages the trip mechanism 68. At the end of the prescribed arc, a bifurcated ski-type cam 70 elevates the trip mechanism 68 to release the discharge arm 18. The arm 18 then is returned by the action of a spring 71, which is fastened to the arm 18 and to the table 15, to its starting position against a snubber 71a. A discharge air cylinder 72 is mounted above and is affixed to the discharge arm 18 and travels through the same arc with each 60 degree travel of the machine.

Figure 7:
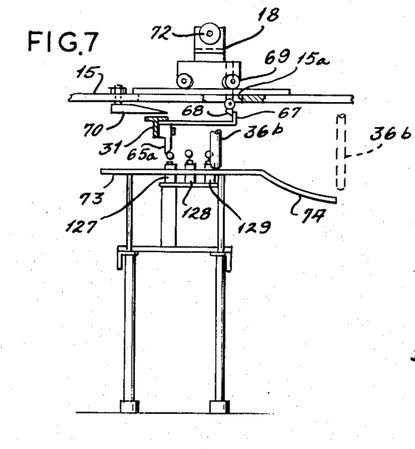
FIG. 7 is a broken elevational view taken along line 7—7 of FIG. 5 showing the details of the discharge mechanism.

A sliding elevator bar 73 (FIG. 7) consisting of a flat steel bar formed on the radius of the machine travel and having an inclined lip 74 on the approach end is mounted in a horizontal plane and extends through an 80 degree arc of the machine travel at the discharge position "B." It serves to elevate the lift rod 36b which in turn elevates bottom mold base 36a carrying the pie tin 57 out of the forming mold 36 and places it in position for the discharge air cylinder 72 to push it from the machine 30 onto the take away conveyor 114.

The stationary accessory column 17 located at the center of the machine, acts as the support and guide for the stationary and rotating control components. The stationary components include a pair of fixed switch operating brackets 75 and 76, a control table bearing and support collar 77, and a dual ring slip ring 78. A revolving control table 79 has mounted on it the brush holders and brushes 80, which transmit power from the stationary slip ring 78, a control relay 81, an air solenoid 82, an air cylinder actuating switch 83, and an air cylinder deactuating switch 84. The switches 83 and 84 control the up and down operation of the die forming head 37 on the crust forming device 30 as it progresses through each machine cycle, as will be explained more fully hereinafter. A stationary air supply line 85 having a rotating pressure joint 86 extends from the accessory column 17 and supplies compressed air to the die actuator cylinder mechanism 40 through conduits 87, and air solenoids 82, which is electrically controlled and operated by the control relay 81, the air cylinder actuating switch 83 and the air cylinder deactuating switch 84.

Although FIG. 1 shows only a single air solenoid 82 and a single holding relay 81, a relay 81 and an air solenoid 82 are provided for each of the forming machines 30. Thus, for the machine 10, there are six relays 81 and six solenoids 82 as well as six branch air conduits 87 leading to the solenoids 82.

Similarly, there are six sets of air cylinder actuating switches 83 and air cylinder deactuating switches 84 (one for each machine 30) positioned around the outer periphery of the control table 79. Since the switch operating brackets 75 and 76 are fixed to the post 17, the rotation of the table 79 carrying the switches 83 and 84 (which are laterally aligned with the brackets 75 and 76, respectively) serves to activate and deactivate the spinning die actuator cylinder mechanisms 40 of each of the machines 30 as the machines 30 pass the prepositioned brackets 75 and 76. The spacing of the brackets 75 and 76 can be adjusted to give the proper time for forming the crust and may be varied depending on the speed of rotation of the machines 30, etc.

The slip ring 78 is supplied with electric energy from a suitable outside source through the column 17 and transmits it through the brushes 80 to the various rotating electrical components including the relays 81, the motors 39, and the heating elements 53.

Figure 2:
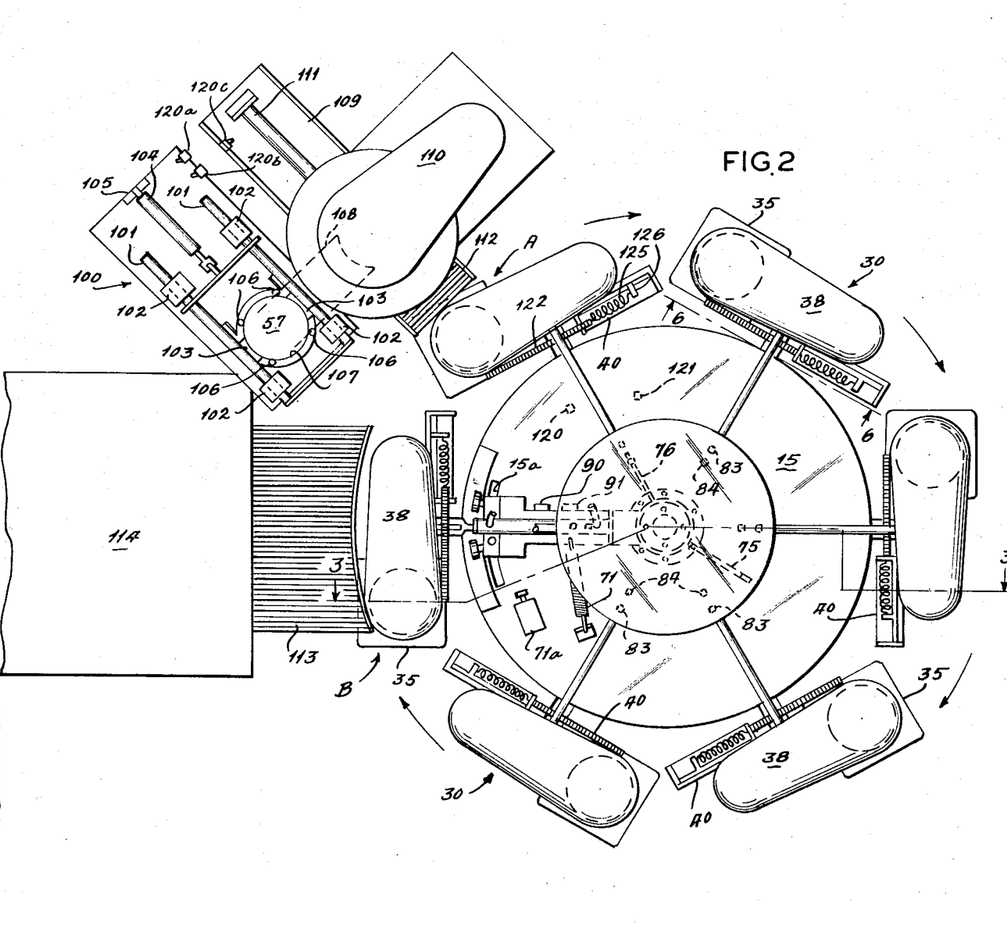
FIG. 2 is a plan view of the crust forming system.
Figure 3:
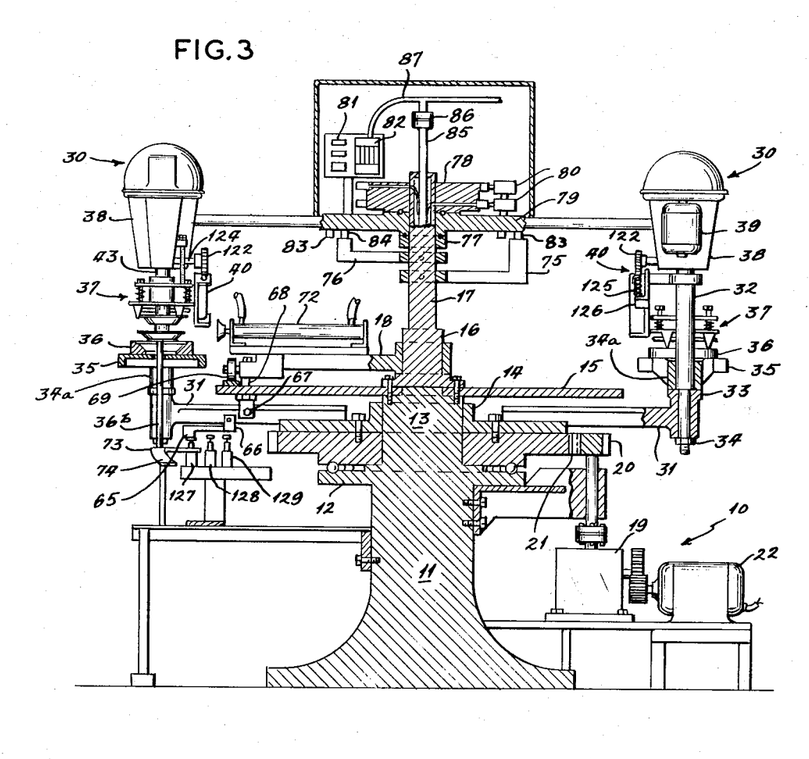
FIG. 3 is a sectional view of the crust forming device taken along line 3—3 of FIG. 2.
Figure 4:
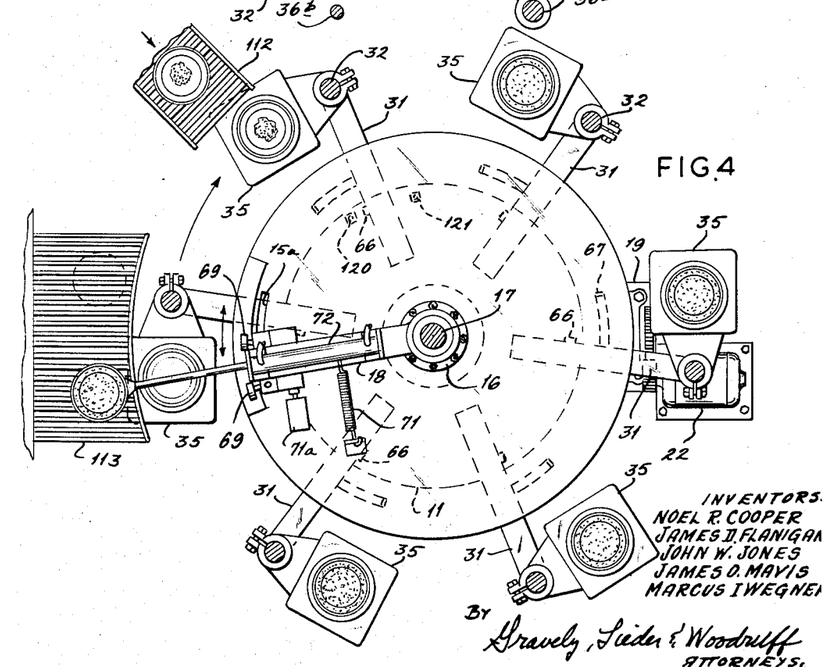
FIG. 4 is a sectional view taken along line 4—4 of FIG. 1.
Figure 5:
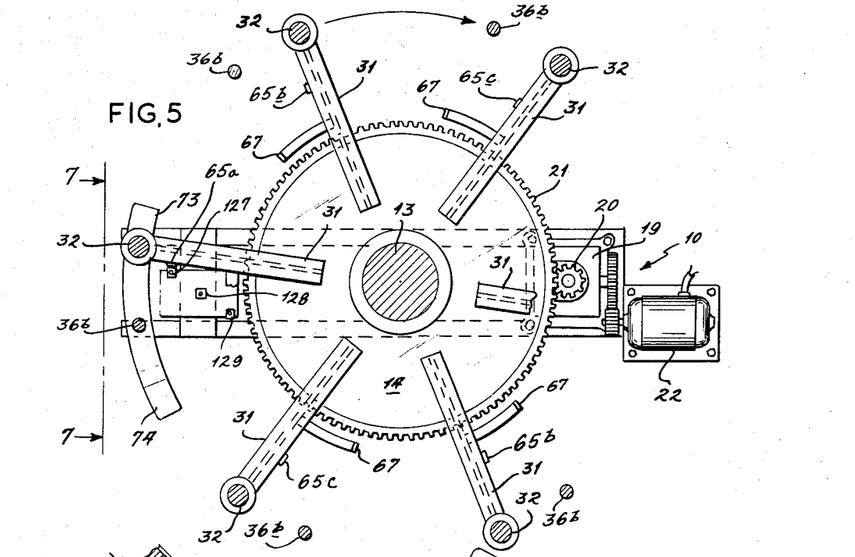
FIG. 5 is a sectional view taken along line 5—5 of FIG. 1.

FIG. 2 shows a plate dispenser 100 comprising two parallel shafts 101 mounted in four sleeve bearing blocks 102 with dispensing knives 103 located and gauged to index and dispense a single pie tin 57 with each forward and reverse motion of the knives 103. Forward and reverse motion of the knives 103 is accomplished by air cylinder 104 anchored at 105 to the base of the dispenser 100. The plate supply stack rests on the dispensing knives 103 within a set of vertical guide rods 106 and the dispensed pie tins drop through an opening 107 in the base of the dispenser 100 onto an inclined grid 108 which guides the pan onto a table 109 beneath a crumb loading machine 110.

The dispensing knives 103 include a slidable top knife which supports the stack of pie tins 57 and which is moved forwardly by the action of the cylinder 104 to drop the plates 57 onto a lower knife. When the cylinder 104 is retracted, the top knife slips under the second lowest pan of the stack of pie pans 57, and drops the lowest pan 57 on the inclined grid 108 and again supports the stack of pans 57.

The measuring and dispensing machine 110 measures and dispenses the prescribed quantity of crust mixture and is an auger type, volumetric filler, such as that made by Bartelt Engineering Co. of Rockford, Illinois. The table 109 mounted beneath the filler 110 supports the pie tin for filling. Also anchored to the table 109 is a loading air cylinder 111 and a loading grid 112. A discharge grid 113 on which the finished pie crust is discharged and slid by gravity to a take-away conveyor and cooling tunnel 114 is positioned adjacent to the pie tin dispenser 100.

Operation of the apparatus shown in FIG. 2 is sequenced and controlled from and by the rotation of the crust forming apparatus 10 in a clockwise direction. The apparatus 10 is provided with an exterior supply of compressed air from a compressor (not shown) and with electric power from a suitable exterior power source (not shown). The mechanical power source 22 applies a rotating drive to the gear box 19, which transmits this drive through the pinion 20 to the bull ring gear 21, causing the turntable 14 to rotate and carry the individual forming machines 30 in a circular path about the axis of the crust forming apparatus 10.

As the carrier arm 18 moves past a predetermined point in its arc of travel, the switch actuator 66 momentarily closes a switch 120 (FIG. 2) which energizes a pneumatic timer 120a which electrically energizes a 4-way air solenoid valve 120b which applies air pressure to the loading cylinder 111 and a 4-way air solenoid valve 120c which applies air pressure to the plate dispenser cylinder 104 causing each to move forward simultaneously. Forward motion of the loading cylinder 111 moves a previously filled pie tin across the loading grid 112 and deposits it in the bottom mold 36 on the plate holder table 35 of a forming machine 30 as it travels past the loading position "A" in FIG. 2. Forward motion of the plate dispenser cylinder 104 moves the dispensing knives 103 forwardly indexing a pie tin. Upon completion of the predetermined timing cycle, the two 4-way air solenoid valves 120b and 120c are de-energized, applying air pressure to the reverse end of the loading cylinder 111 and the plate dispensing cylinder 104 causing each to move in a reverse direction. The loading cylinder 111 returns to a starting position, and the plate dispensing cylinder 104 also returns to a starting position and in so doing, returns the dispensing knives 103 to their starting position dropping the previously indexed pie tin, which falls by gravity through the opening 107 onto the channeled guide 108 and to the filling position on the filling table 109.

As the carrier arm 18 continues to travel in a clockwise manner (indicated by the arrows in FIG. 2), the switch actuator 66 momentarily engages a switch 121 which energizes the filling and dispensing machine 110, causing it to complete a predetermined filling cycle which deposits a charge of crust crumbs in the pie pan on the loading table 109. Completion of this filling cycle completes the loading operation and prepares the equipment for loading the pie pan 57 and crumbs onto the next succeeding forming machine 30, as it passes the loading grid position "A."

Upon completion of the loading phase at the loading position "A," the forming machine 30 is carried forward in a clockwise direction (indicated by the arrows in FIG. 2) whereupon the air cylinder actuating switch 83 on the control table 79 engages the actuator bracket 75 which energizes the air solenoid 82 and the holding relay 81 which applies and maintains air pressure on the spinning die air cylinder 40 causing it to retract and lower the spinning die mechanism 37. The retracting connection between the cylinder 40 and the die 37 includes a roller chain 122, a chain sprocket 123 and a geared shaft 124 which meshes with a gear on the lowering quill 43 of the forming machine 30. The chain 122 is fastened at one end to the rod fastened to the piston of the hydraulic cylinder 40, and at the other end to a spring 125 which is anchored to a bracket 126 fastened to the cylinder 40.

The motor 39 rotates the stem 42 and the radiant heated spinning die 41 continuously, and as the post 43, the stem 42 and the spinning die 41 are lowered, the retainer points 50 engage and hold the pie tin 57 stationary as the spinning die 41 contacts the crumbs and starts forming the desired crust. The spinning die 41 continues forming and fusing the crust as the forming machine 30 continues its travel to a predetermined point in its arc, where the air cylinder deactivating switch 84 on the control table 79 engages the switch actuator bracket 76 and releases the holding relay 81, thus de-energizing the air solenoid 82 and applying air pressure to reverse the motion of the air cylinder 40 and allowing the spring tension on the chain 122 to raise the spinning die mechanism 37. At this point the formed crust 59 is completed and ready for discharge from the bottom mold 36.

Continuing to travel in a clockwise direction, the forming machine 30 approaches the discharge position "B." The bottom of the lift rod 36b engages the inclined lip 74 of the sliding elevator bar 73 which moves the lift rod 36b and raises the mold bottom 36a and the pie tin 57 including the crust 59 formed therein into discharge position with the pie tin 57 above the top of the lower mold 36 and maintains it in this position until ejected from the machine 30. As the forming machine 30 enters the discharge zone "B" of its travel, the trip plate 67 on the carrier arm 31 engages the trip mechanism 68 affixed to the discharge arm 18 causing the discharge arm 18 to rotate in an angular fashion about the center post 16 and in sequence with the forming machine 30. The discharge air cylinder 72 mounted on the discharge arm 18 therefore maintains the same angular speed of travel and in sequence with the pie tin 57 to be discharged. When the selector switch actuator 65 on the carrier arm 31 momentarily engages one of the switches 127, 128 or 129, a pneumatic timer 90 is energized and a discharge air cylinder solenoid valve 91 applies air pressure to the discharge cylinder 72 causing it to extend itself and push the finished pie crust and the pie tin 57 onto the discharge grid 113. Selection of the specific switch actuator 65a, 65b or 65c governs which of the switches 127, 128 or 129 is engaged and determines at which of three points in the discharge zone "B" the discharge of the pie pan 57 occurs. The switches 127, 128 and 129 are staggered radially and circumferentially with respect to the position of the table 15. The switch actuators 65a, 65b and 65c are correspondingly positioned on successive forming machine arms 31. Thus three separate lines of pie tins 57 are deposited on corresponding conveyors in the cooling tunnel 114. More or less switches could be used if desired. Upon completion of the predetermined timing cycle, the discharge air solenoid valve 82 is de-energized, and applies air pressure to retract the discharge air cylinder 72.

As this point, as the forming machine 30 approaches the limits of the discharge zone "B," the trip mechanism 68 on the discharge arm 18 engages a ski-type cam elevator 70 which drives the trip mechanism 68 upwardly in a slot 15a in the table 15 to release the trip mechanism 68 from trip plate 67 on the carrier arm 31 and allows the discharge arm 18 to be returned by the action of the spring 71 to its starting position, resting against the snubber 71a at the approach to the discharge zone "B." As the forming machine 30 travels beyond the discharge zone "B" in a clockwise rotation toward the loading zone "A," the lift rod 36b slides off the end of the slide elevator bar 73 and drops the bottom mold base 36a into a loading position in the bottom mold 36. This completes the forming cycle.

If desired, the unloading of the finished pie tin 57 and crust 59 from the machine 30 may be accomplished by the use of a rotating arm driven by the rotating turntable 14 or an independent motor and timed to push the finished pie crust 59 and pan 57 from the raised bottom 36a of the lower mold 36 onto the unloading dock 113. This arrangement results in only a single line of pie tins 57 and crusts 59 being positioned on the dock 113.

Also, the air cylinder mechanism 40 may be replaced by a 280° radial torque air motor which is directly connected to the quill 43 to raise and lower the quill 43, the spindle 42, and the die 41. The air motor also is driven by compressed air and controlled by the switches 83, 84, the solenoid 82 and the relay 81.

As shown, the crust forming apparatus 10 is equipped with six forming machines 30, each equipped with controls, switches and operators as set forth in detail in the explanation of construction and operation in the preceding paragraphs. Each forming machine 30 completes a pie crust forming cycle with each rotation of the crust forming apparatus 10. More or less than six forming machines 30 may be used if desired.

Thus, it is apparent that the present invention provides a crust forming machine which achieves all of the objects and advantages sought therefor.

This invention is intended to cover all changes, and modifications of the examples of the invention herein chosen for purposes of the disclosure, which do not constitute departures from the spirit and scope of the invention.

What is claimed is:

1. A crumb pie crust forming machine comprising a bottom mold having a cavity therein adapted to receive a pie shell receptacle, a rotatable, vertically reciprocable top mold constructed and arranged to fit within said bottom mold in spaced relationship to a pie shell receptacle positioned therein, means for adjustably determining said spacing, means for heating said top mold, means for rotating said top mold, means for vertically moving said top mold, and means for holding a pie shell receptacle in fixed position in said bottom mold.

2. A crumb pie crust forming machine comprising a fixed bottom mold having a base portion and provided with a cavity adapted to receive a pie shell receptacle having a flange around the outer periphery thereof, a rotatable, vertically reciprocable top mold constructed and arranged to fit within said bottom mold in spaced relationship to a pie shell receptacle positioned therein, said rotating top mold adapted to spin a crumb mixture positioned within a pie shell receptacle outwardly over the receptacle inner surface to form a crumb crust, means for rotating said top mold, means for vertically reciprocating said top mold, retaining means vertically aligned with the flange of a pie shell receptacle positioned in said bottom mold cavity, means resiliently interconnecting said retaining means and said reciprocating means for said top mold, said retaining means being movable with said top mold during the initial phase of the downward movement thereof, said top mold being movable against said resilient means independently of said retaining means after said retaining means firmly engages and holds the pie shell receptacle flange against said bottom mold, and adjustable stop means for limiting downward travel of said top mold.

3. The crust forming machine defined in claim 2 wherein a base portion of said bottom mold is vertically movable and including means for moving said base portion upwardly to facilitate unloading of a pie shell receptacle positioned thereon.

4. A crumb pie crust forming machine comprising a fixed bottom mold having a movable base portion and provided with a pie shell receiving receptacle therein, a vertically movable top mold, a rotatable shaft fastened to said top mold, a vertically movable post housing said shaft, said shaft being rotatable with respect to said post and vertically movable therewith, a housing receiving said post, said post being vertically movable with respect to said housing, a flange fixed to said housing having an eye therein, a flange fixed to said post and vertically movable therewith, said flange having openings therethrough, a stud uprightly fixed at one end to said post flange and having its other free end received in the eye of said housing flange, said stud being vertically movable in the eye, vertically adjustable stop means positioned on the free end of said stud locking said stud in said housing flange eye and determining the downward travel of said post, retaining means adjacent to said top mold, upright studs fastened at one end to said retaining means and having free ends received in the post flange openings, said studs being vertically movable in said openings, resilient means surrounding said studs and positioned between said retaining means and said post flange, fastening means on the free ends of said studs securing said studs in said post flange openings, spaced contact members on the lower edge of said retaining means adapted to engage the flange around the outer periphery of a pie shell receptacle positioned in the lower mold cavity and to urge the flange against said lower mold, said members engaging the pie shell receptacle flange before said stop means engages said housing flange, further downward travel of said post and said upper mold compressing said resilient means and urging said members toward said lower mold, a heating element positioned within said casing to heat said upper mold, drive means for rotating said shaft, means for vertically moving said post, and means for vertically moving said bottom mold movable base section.

5. An apparatus for continuously forming pie crusts in pie crust receptacles comprising a base, a rotatable turntable member on said base, a fixed table on said base, a fixed column, a rotatable column member synchronized to rotate with said turntable member about said fixed column, means for rotating said turntable member and said rotatable column member, a source of electrical energy, a source of hydraulic power, means for transmitting said hydraulic power to at least one of the rotatable members, a plurality of crust forming machines carried on the outer periphery of said rotatable turntable member and movable therewith, each of said crust forming machines comprising a stationary lower mold having a pie crust receptacle receiving cavity therein with a vertically movable base section, a rotatable, vertically movable top mold, means for heating said top mold, means for rotating said top mold, and means for vertically reciprocating said top mold into and out of nested arrangement with the receptable receiving cavity of the lower mold, means for loading a predetermined portion of crust ingredients into pie crust receptacles, means for positioning the filled crust receptacles into the receptacle receiving cavity of the lower mold of one of said crust forming machines, said top mold and bottom molds being nested during formation of the pie crust in the receptacle, said top mold being vertically retracted thereafter, cam means for vertically moving said vertically movable base section after said pie crust is formed and said top mold has been retracted, means movable with said crust forming machines through the final portion of their crust forming cycles for unloading said pie crust receptacles and formed pie crust from the raised base section of said lower mold, and a series of switches electrically connected to the source of electrical energy and switch activators for energizing and de-energizing said means for vertically reciprocating said top mold, said crust ingredient loading means, and said pie crust receptacle unloading means.

6. An apparatus having a closed pie crust forming cycle for continuously forming pie crusts in pie crust receptacles comprising a base, a rotatable turntable on said base, a fixed table on said base, a fixed column, a rotatable shaft synchronized to rotate with said turntable, means for rotating said turntable and said rotatable shaft, means for transmitting electrical energy from a fixed member to a rotating member, means for transmitting a fluid under pressure from said fixed column to the rotating turntable, a plurality of crust forming machines rotatably carried on the outer periphery of said rotatable turntable by carrier arms, each of said crust forming machines traveling through a crust forming cycle during one revolution of said turntable and comprising a stationary lower mold having a pie crust receptable receiving cavity therein with a vertically movable base section, a push rod operatively connected to said base section for vertical movement therewith, a rotatable, vertically reciprocable upper mold, radiant heating means for said top mold, means for rotating said upper mold, means for vertically reciprocating said upper mold including a drive shaft operatively connected at one end to said upper mold, a sprocket fastened to the other end of said drive shaft, a drive chain trained over said sprocket, means resiliently anchoring one end of said chain, and a hydraulic piston and cylinder operatively connected to the other end of said chain, conduit means transmitting the fluid under pressure from the turntable to the said hydraulic piston and cylinder, said means for vertically reciprocating said upper mold constructed and arranged to move said upper mold downwardly and stretching said resilient anchor means when said piston is actuated, said resilient anchor means moving said upper mold upwardly when said piston is free of hydraulic fluid pressure, means for loading a predetermined portion of crust ingredients in a pie crust receptacle, means at the start of a pie crust forming cycle of said apparatus for loading a pie crust receptacle into the receptacle receiving cavity of one of said lower molds, means for applying pressurized fluid through said conduit to said hydraulic piston and cylinder to lower said upper mold after said pie crust receptacle is positioned in said receptacle receiving cavity of one of said lower molds, second means for interrupting flow of pressurized fluid to said hydraulic piston and cylinder so that the resilient anchor means retracts said upper mold after said crust forming machine has traversed a predetermined portion of its travel cycle, a discharge mechanism comprising an arm rotatable mounted at one end on said fixed column, means on the other end of said arm for moving said arm through a limited arc along the outer periphery of said fixed table, resilient means anchoring said arm to said fixed table at the end portion of a crust forming cycle of said apparatus, a hydraulic cylinder and piston mounted on said arm and movable therewith, and cam means for engaging said arm with each of said crust forming machines as said crust forming machines enter the end portion of their cycle and for disengaging said arm from said crust forming machines when their cycles are completed, second cam means engageable with said push rod on said bottom mold base section, said cam means engaging said push rod during the discharge portion of the crust forming cycle and raising the crust receptacle above the top of said bottom mold, and means for activating said discharge piston and cylinder to extend said piston into engagement with said crust receptacle and move said crust receptacle out of said crust forming machine.

7. A method of forming crumb pie crusts in a pie crust receptacle including the steps of positioning a predetermined portion of crust ingredients in a pie crust receptacle, holding the crust receptacle in a mold cavity, lowering a cooperating rotating upper mold into engagement with the crust ingredients to spin said crust ingredients in a thin layer over the inner surface of said pie crust receptacle, and simultaneously heating said crust ingredients to fuse said ingredients into a pie crust.

8. A method of forming crumb pie crusts in a pie crust receptacle including the steps of positioning a predetermined quantity of crust ingredients in a crust receptacle, holding said crust receptacle in a mold cavity, lowering a heated rotating cooperating mold into engagement with the crust ingredients to position said ingredients evenly over the inner surface of said pie shell, maintaining said heated rotating mold in spaced engagement with the crust receptacle to fuse said crust ingredients into a pie crust, withdrawing said rotating mold, raising the crust receptacle above the mold cavity, moving the crust receptacle from said mold, and cooling said crust.

9. A method of continuously forming crumb pie crusts including the steps of loading a predetermined portion of crust ingredients in a crust receptacle, positioning said crust receptacle and ingredients into a lower mold of a crust forming machine, rotating said crust forming machine in a closed crust forming cycle, holding said crust receptacle firmly against the lower mold, spinning said crust ingredients against the inner surface of said receptacle to form a pie crust of substantially even thickness, heating said crust ingredients to fuse said crust, freeing said formed crust and receptacle from said lower mold, and transferring said crust and receptacle from said crust forming machine to a cooling chamber.

10. A method of forming crumb pie crusts in a pie crust receptacle including the steps of positioning a predetermined quantity of crust ingredients in a crust receptacle, holding said crust receptacle in a mold cavity, lowering a heated rotating cooperating mold into engagement with the crust ingredients to position said ingredients evenly over the inner surface of said pie crust, maintaining said heated rotating mold in spaced engagement with the crust receptacle to fuse said crust ingredients into a pie crust, withdrawing said heated mold, and removing said crust receptacle from said mold cavity.

11. A pie crust forming machine for molding a crumb pie crust in a pie shell receptacle, comprising
   (a) a bottom member adapted to retain a pie shell receptacle in fixed non-rotative position thereon,
   (b) a top member vertically aligned and shaped to conform to the shape of the interior surface of the pie shell receptacle and to be received therein during molding of the pie crust,
       (1) said top member being rotatable about a center line extending through the center of the pie shell receptacle and perpendicular thereto when positioned on the bottom member to spin a crumb mixture positioned within the pie shell receptacle outwardly over the receptacle inner surface to form a crumb crust,
       (2) said top member being spaced from the pie shell receptacle a predetermined distance during molding of the pie crust,
   (c) means for rotating the top member about said center line, and
   (d) means for vertically reciprocating at least one of said members to bring the top member into spaced engagement with the pie shell receptacle.

12. The structure of claim 11 including means on the top member vertically relatively movable with respect to the top member and being non-rotatable therewith for engaging the pie shell receptacle and holding the receptacle non-rotatively on the bottom member during forming of the pie shell.

References Cited by the Examiner

UNITED STATES PATENTS

| | | | |
|---|---|---|---|
| 817,488 | 4/06 | Hutchison | 107—1.5 |
| 898,478 | 9/08 | Jackson | 107—1.5 |
| 1,341,081 | 5/20 | Sharp | 107—54.28 |
| 1,628,828 | 5/27 | Denmead | 107—49 X |
| 2,190,483 | 2/40 | Pacilio | 107—1.5 |
| 2,989,932 | 6/61 | Egee et al. | 107—1.5 |
| 3,030,668 | 4/62 | Taylor | 18—59.2 X |
| 3,034,178 | 5/62 | Cartier et al. | 18—59.3 X |
| 3,071,087 | 1/63 | Kreisky et al. | 107—15.9 |

WALTER A. SCHEEL, *Primary Examiner.*

CHARLES A. WILLMUTH, ROBERT E. PULFREY,
*Examiners.*